United States Patent [19]

Martinsen

[11] Patent Number: 4,871,145
[45] Date of Patent: Oct. 3, 1989

[54] DEVICE FOR EXTENSION OF ALUMINUM DUCTS

[75] Inventor: Finn Martinsen, Orje, Norway

[73] Assignee: Finn Martinsen A/S, Orje, Norway

[21] Appl. No.: 666,085

[22] PCT Filed: Feb. 22, 1984

[86] PCT No.: PCT/NO84/00011

§ 371 Date: Oct. 22, 1984

§ 102(e) Date: Oct. 22, 1984

[87] PCT Pub. No.: WO84/03345

PCT Pub. Date: Aug. 30, 1984

[30] Foreign Application Priority Data

Feb. 23, 1983 [NO] Norway .................................. 830636

[51] Int. Cl.$^4$ ................................................ B21F 9/00
[52] U.S. Cl. .................................................... 254/199
[58] Field of Search ........................... 254/199; 72/367; 138/109, 97, 98, 96 T

[56] References Cited

U.S. PATENT DOCUMENTS 1,241,193  9/1917  Carlino ................................ 242/68.6
2,882,072  4/1959  Noland ............................. 138/109 X
3,789,651  2/1974  Dickerson ............................. 72/367
4,020,873  4/1977  Palarino ............................. 138/96 T
4,327,776  5/1982  Meserole ............................. 138/109

FOREIGN PATENT DOCUMENTS 55-100830  1/1980  Japan ..................................... 72/367
1433932  4/1976  United Kingdom .
2067707  7/1981  United Kingdom ................... 72/367

Primary Examiner—Stuart S. Levy
Assistant Examiner—Katherine Matecki
Attorney, Agent, or Firm—Sughrue, Mion, Zinn, Macpeak & Seas

[57] ABSTRACT

A cylindrical end piece made of steel constitutes an attachable device for pulling out compressed extendible aluminum ducts. The cylindrical end piece has its inner edge sized slightly different from that of the duct and being telescopingly fixed at the inner edge to the end of the duct in coaxial fashion. A strip of plastics is projected through two diametrically opposed apertures in the end piece at the outer edge, and the two ends of the strip are secured to each other outside the end piece.

2 Claims, 1 Drawing Sheet

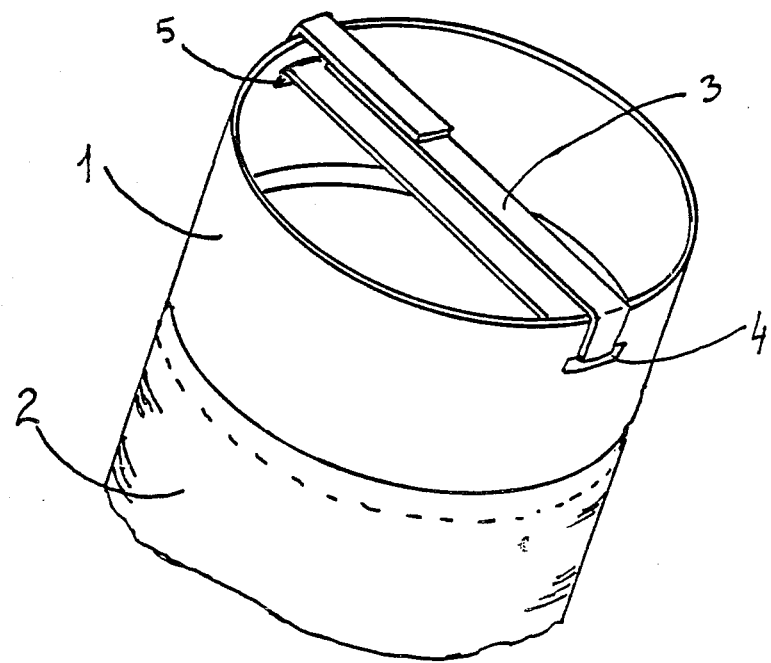

DEVICE FOR EXTENSION OF ALUMINUM DUCTS

FIELD OF THE INVENTION

This invention relates to a device for pulling out compressed manufactured, extendible aluminum ducts.

BACKGROUND OF THE INVENTION

Such ducts are increasingly used as they have great advantages in connection with storing and transportation, as well as assembling.

Such extendible ducts frequently are delivered to the construction sites in lengths of e.g. 1 m and thereafter may be pulled out to full length of 3 m.

For known ducts of this type, two persons have to be available to accomplish the extension from 1 m to 3 m length.

SUMMARY OF THE INVENTION

The invention provides a device making it possible for one person to undertake such extension of the extendible, compressed aluminum ducts.

By means of the features described in the characterizing clause of the claims, such aluminum ducts may be pulled out by one person by means of a suitable securing, such as a door handle, a nail etc.

The invention thereby accomplishes significant practical and economic savings at the construction sites.

BRIEF DESCRIPTION OF THE DRAWINGS

The drawing disclosed schematic, in perspective view, one end of a duct or channel with an end piece inserted.

DESCRIPTION OF THE PREFERRED EMBODIMENT

An end piece 1 made of steel, has substantially the same diameter as the duct 2, but at the edge it is provided with a decreased diameter for insertion into the duct or channel 2. Upon installing in the duct, the duct is secured to the end piece 1, for example by spot welding.

A strip 3 of plastics is threaded through diametrically opposed apertures 4 and 5 at the outer edge of the end piece 1, whereafter the two ends of the strip 3 are placed against each other at the end of the end piece 1 and thereafter fixed to each other in a suitable way.

By means of the device according to the invention, a holding device is achieved, which can be secured to the one end of the extendible duct in such a way that one person can secure the strip 3 to suitable fixed means and by himself pull the other end of the duct to the full length before assembling.

I claim:

1. An attachable device for pulling out a compressed, extendible aluminum duct (2), said device comprising:
    a pair of cylindrical end pieces (1) made of steel having opposite inner and outer edges,
    said cylindrical end pieces having at least a portion at said inner edge sized slightly different from that of said duct,
    and said inner edge of said cylindrical end pieces being insertably fixed to respective ends of said duct, and
    a strip (3) of plastics being fixed to diametrically opposed positions at said outer edge of said end pieces and extending across the open outer edge thereof;
    whereby, with said end pieces fixedly coupled to opposite ends of said compressed, extensible aluminum duct, one of said attachable end pieces may be secured to a fixed member via said strip, permitting a single person to pull the other end of the duct to increase the length of the duct by pulling on said strip of the end piece fixed to the other end of said duct.

2. The attachable device according to claim 1, wherein said cylindrical end pieces (1) include diametrically opposed apertures (4, 5) within the outer edge thereof, and wherein the strip of plastics (3) extends through said diametrically opposed apertures (4, 5) with ends of the strip (3) being secured to each other outside the end pieces (1).

* * * * *